(12) United States Patent
McKinney et al.

(10) Patent No.: US 9,258,226 B2
(45) Date of Patent: *Feb. 9, 2016

(54) SYSTEMS AND METHODS FOR DUAL NETWORK ADDRESS TRANSLATION

(71) Applicant: Acceleration Systems, LLC, Lexington, KY (US)

(72) Inventors: Jack Dennis McKinney, Lexington, KY (US); Richard Lee McKinney, Washington, DC (US)

(73) Assignee: Acceleration Systems, LLC, Lexington, KY (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/175,298

(22) Filed: Feb. 7, 2014

(65) Prior Publication Data
US 2014/0219280 A1    Aug. 7, 2014

Related U.S. Application Data

(63) Continuation of application No. PCT/US2014/010023, filed on Jan. 2, 2014.

(60) Provisional application No. 61/748,248, filed on Jan. 2, 2013.

(51) Int. Cl.
*H04L 12/56* (2006.01)
*H04L 12/741* (2013.01)
*H04L 29/12* (2006.01)

(52) U.S. Cl.
CPC ............ *H04L 45/741* (2013.01); *H04L 45/745* (2013.01); *H04L 61/2525* (2013.01); *H04L 61/2007* (2013.01); *H04L 61/2514* (2013.01); *H04L 61/2592* (2013.01)

(58) Field of Classification Search
None
See application file for complete search history.

(56) References Cited

U.S. PATENT DOCUMENTS

| | | | |
|---|---|---|---|
| 7,149,808 B2 | 12/2006 | Lu | |
| 7,450,585 B2 | 11/2008 | Dispensa | |
| 7,582,861 B2 | 9/2009 | Mukaibatake | |
| 7,593,388 B1 * | 9/2009 | Mitchell | H04L 12/66 370/352 |
| 7,640,319 B1 * | 12/2009 | Sylvain | H04L 12/4625 709/218 |
| 7,734,819 B1 | 6/2010 | Somasundaram et al. | |
| 7,743,155 B2 | 6/2010 | Pisharody et al. | |

(Continued)

OTHER PUBLICATIONS

International Search Report, PCT/US2014/010023, dated Apr. 16, 2014, 16 pages.

(Continued)

*Primary Examiner* — Candal Elpenord
(74) *Attorney, Agent, or Firm* — Dinsmore & Shohl LLP

(57) ABSTRACT

Included are systems and methods for providing dual network address translation. Accordingly, some embodiments include translating, via a processor at a network operations center (NOC), a public source address and a public destination address to and from assigned unique private addresses for data to be communicated across a wide area network, while including gateway functions to manage an application with an imbedded IP address. Some embodiments include communicating, via the processor at the NOC, the data to a ReNAT virtual private network (VPN) with packets wrapped in a private ReNAT defined protocol that includes the public source address and the public destination address. Still some embodiments include mapping, via the processor at the NOC, a unique private address in the data to customer defined private IP addresses.

20 Claims, 10 Drawing Sheets

(56) References Cited

U.S. PATENT DOCUMENTS

| | | |
|---|---|---|
| 7,764,691 B2 | 7/2010 | Sehgal et al. |
| 7,814,541 B1 * | 10/2010 | Manvi ................ H04L 12/4645 713/154 |
| 7,840,701 B2 | 11/2010 | Hsu et al. |
| 8,170,014 B1 | 5/2012 | Metz et al. |
| 8,249,081 B2 | 8/2012 | Chang et al. |
| 8,281,387 B2 | 10/2012 | Gupta et al. |
| 2002/0042832 A1 | 4/2002 | Fallentine et al. |
| 2002/0042875 A1 * | 4/2002 | Shukla .............. H04L 29/12009 713/151 |
| 2002/0136210 A1 * | 9/2002 | Boden ................ H04L 12/4641 370/389 |
| 2006/0225130 A1 | 10/2006 | Chen et al. |
| 2007/0019545 A1 * | 1/2007 | Alt ..................... H04L 12/4633 370/230 |
| 2007/0180088 A1 | 8/2007 | Zhao |
| 2007/0180142 A1 | 8/2007 | Small et al. |
| 2008/0034420 A1 | 2/2008 | Chang |
| 2008/0201486 A1 | 8/2008 | Hsu et al. |
| 2010/0046526 A1 | 2/2010 | Kompella |
| 2011/0026537 A1 * | 2/2011 | Kolhi ................. H04L 12/4633 370/401 |
| 2011/0252146 A1 | 10/2011 | Sanamaria et al. |
| 2012/0005476 A1 | 1/2012 | Wei et al. |
| 2012/0179831 A1 | 7/2012 | Brousseau et al. |
| 2012/0317252 A1 | 12/2012 | Vemulapalli |
| 2013/0179580 A1 * | 7/2013 | Short ................. H04L 63/0272 709/227 |
| 2013/0239198 A1 * | 9/2013 | Niemi ................ H04L 63/0272 726/12 |
| 2014/0215050 A1 | 7/2014 | Lu |

OTHER PUBLICATIONS

International Search Report, PCT/US2014/15035, dated Jun. 24, 2014, 14 pages.
International Preliminary Report on Patentability dated Jul. 16, 2015 relating to International Application No. PCT/US2014/010023 filed Jan. 2, 2014.
Office Action pertaining to U.S. Appl. No. 14/175,306 dated Aug. 11, 2015.

* cited by examiner

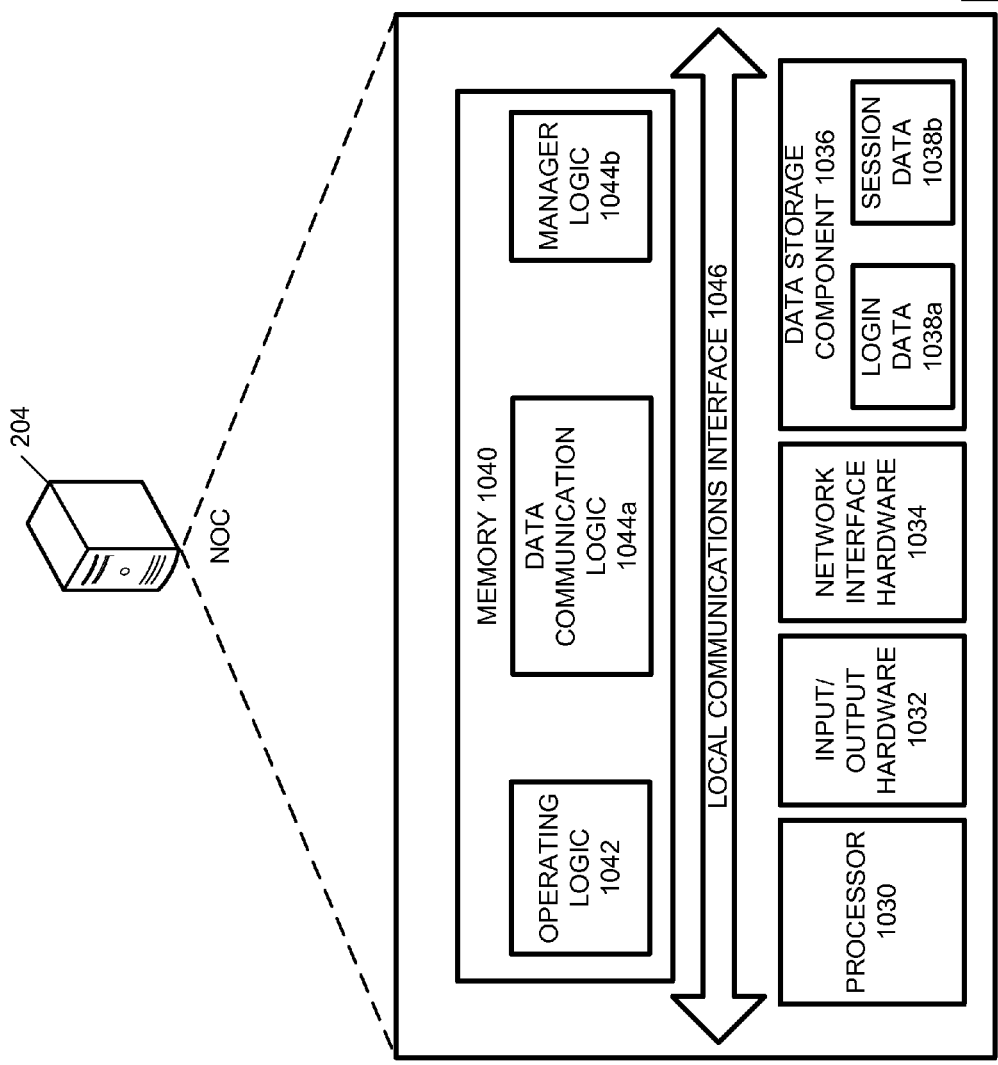

SYSTEMS AND METHODS FOR DUAL NETWORK ADDRESS TRANSLATION

CROSS REFERENCE

This application is a continuation of PCT application number PCT/US14/10023, filed Jan. 2, 2014, and entitled Systems and Methods for Providing a ReNAT Communications Environment, which claims priority to U.S. Provisional Application No. 61/748,248, each of which is hereby incorporated by reference in its entirety.

BACKGROUND

1. Field

Embodiments provided herein generally relate to providing a ReNAT communications environment, and particularly to Systems and methods for providing dual network address translations (NATs) for providing access to a network.

2. Technical Background

The Internet supports worldwide communication between computers using a group of standard protocols. One of these protocols, the Internet Protocol (IP), assigns a unique address to each computer known as an IP address. IP is currently available in two versions: IPv4 with 32 bit addresses, and IPv6 with 128 bit addresses.

Growth of the Internet has caused utilization of all available 32 bit addresses in IPv4. One result of the limited number of addresses is that most organizations now use one of the three private address spaces defined by IPv4. These private IP addresses cannot be used on the public Internet. Gateway routers manage the interface between a private intranet and the public Internet. Gateway routers provide various functions to hide or mask the private internal IP when communication outside the private network is required.

One common method used by gateway routers in commercial environments is the creation of a virtual private network (VPN) to connect external users to the internal private network. The VPN provides an envelope or wrapper protocol to hide the internal IP addresses and data while the packet is routed across the public Internet to the user.

ReNAT architecture provides a mechanism for multiple organizations using a VPN with private address realms to share a public software resource on the Internet. Each organization uses a VPN to communicate with remote users over the pubic Internet. In this way, the VPN creates a virtual tunnel between the organization's private IP network and servers and the remote user. Each VPN provides two functions to enable secure communication. The first function is that information in the virtual tunnel may be encrypted to protect it from unauthorized access. The second function is that organization's private IP network is extended to the user workstation.

While the use of private IP addresses and VPN allows users to securely access private networks, these two facts mean that organizations using VPNs cannot make use of software functions on the public Internet. Other issues are additionally present and will be discussed in more detail, below.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 10 depicts various hardware components that may be present in a NOC, according to embodiments described herein.

DETAILED DESCRIPTION

Figure 1:
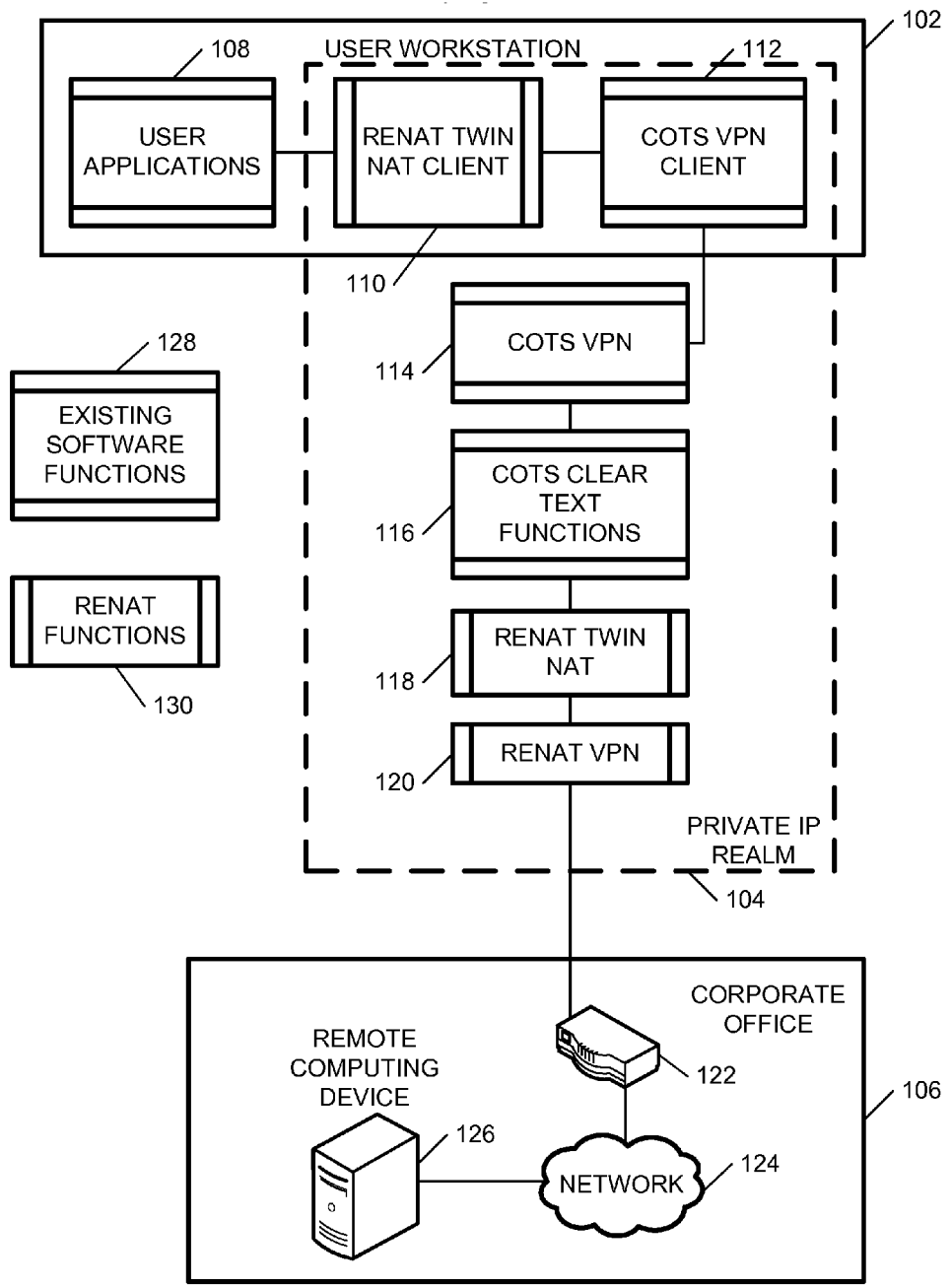
FIG. 1 depicts a network environment for communicating data with a remote computing device, according to embodiments described herein.

Embodiments described herein include ReNAT systems and methods for facilitating communication between a user computing device in a private realm and a remote computing device over a wide area network (or other network). Specifically, the user computing device may communicate with the remote computing device via a satellite network or other network that may have slower than desired connection speeds. While the user may utilize a virtual private network, the communication may be routed from a user workstation, which includes a ReNAT twin NAT (network address translation) client and a commercial off the shelf (COTS) VPN client to a network operations center (NOC). The NOC includes a COTS VPN, COTS clear text software, a ReNAT Twin NAT, and a ReNAT VPN.

Accordingly, embodiments described herein provide a process to allow a group of organizations with network access using VPN communication with private address realms to share software functions, such as acceleration technology. COTS acceleration technology is currently available and may operate on clear text inside an organization's private IP network. In operation, embodiments described herein create a private IP realm or address space that is isolated from both the public Internet IP addresses and the organization's private IP addresses. Accordingly, embodiments described herein assign a unique private IP address (UPIP) for each organization system that communicates through the COTS process, so that all organization systems have unique IP addresses within the ReNAT private IP realm. The ReNAT twin NAT clients translate between a customer-assigned private IP address and assigned UPIP so that the COTS clear text component, which may be configured as clear text process software, has unique IP addresses for all user organization systems even when multiple organizations have the same private IP addresses.

Outside the ReNAT environment, a user application (on the user workstation) and the corporate office remote computing device see only the customer's internal private IP addresses. The ReNAT twin NAT client and the ReNAT twin NAT are coordinated to translate between customer-assigned private IP addresses and ReNAT assigned UPIP so that the user application and corporate office server see only the organization's internal private IP addresses.

Additionally, some embodiments described herein are configured for facilitating translation of network addresses for communications between a client workstation and a wide area network. In some embodiments, the translation traverses a virtual private network (VPN), as discussed above. Accordingly, these embodiments may be configured as a two-way communication, where the Dual NAT software assigns a family of IP addresses (in IPv4, IPv6, or other similar protocol) to a private realm, such as a corporate network. Similarly, on the network operations center (NOC) side (which is between the private realm and the wide area network), a plurality of IP addresses are assigned, one for each private realm. As an example, a first private realm may be assigned IP addresses 10.0.0.x, where x=1, . . . , n. The NOC may associate those addresses with an IP address, such as 10.254.254.254 and other private realms may be associated with IP addresses, such as 10.254.254.253, etc., each having 10.0.0.x as an in-network address. Additionally, the NAT relationships may be stored in the two Dual NATs, which facilitate translation from a user computing device on a private network with a server at a corporate office, while the client workstation and the wide area network are unaware of any IP address conversion.

Additionally, some embodiments provide a source IP address on external packets to identify a source gateway or second VPN. Packets from a Dual NAT may include the destination public IP address to identify the destination gateway or second VPN.

Still some embodiments described herein provide a virtual private network within a network operations center (NOC) for facilitating communication of data between a wide area network and a client workstation in a private realm. As described above, the NOC may be configured to facilitate communication of data between the private realm and the wide area network, such as through a satellite communication, using acceleration techniques. Accordingly, the VPN created in the NOC may be utilized to provide a security barrier such that commercial off the shelf (COTS) operations are only performed within a device and never communicated between devices. Embodiments described herein may additionally facilitate assignment of IP addresses in IPv4 and/or IPv6, via utilization of the dual NATs.

Referring now to the drawings, FIG. 1 depicts a network environment for communicating data with a remote computing device 126, according to embodiments described herein. As illustrated, the network environment includes a user workstation 102, which may include a personal computer, tablet, mobile computing device, etc. The user workstation 102 may be configured for communicating with the remote computing device 126 via a private IP realm 104. The user workstation 102 may include user applications 108, as well as a ReNAT twin NAT client 110 and a COTS VPN client 112 for creating a private IP realm or address space (ReNAT Private IP Realm) that is isolated from both the public Internet IP addresses and using an organization's private IP addresses. Specifically, ReNAT twin NAT client 110 assigns a unique private IP address (UPIP) for each computing device accessing the private IP realm 104 (such as user workstation 102) that communicates through the COTS VPN client, so that all computing devices (such as the user workstation 102) have unique IP addresses within the private IP realm 104. ReNAT twin NAT client 110 provides paired and coordinated twin NAT functions to manage the private IP realm of the remote computing device 126.

Included within the private IP realm 104 are a COTS VPN 114, a COTS clear text functions 116, a ReNAT twin NAT 118, and a ReNAT VPN 120. The ReNAT twin NAT client 110 and the ReNAT twin NAT 118 translate data between customer assigned private IP addresses and assigned UPIP so that the COTS clear text functions 116 has unique IP addresses for all user organization systems even when multiple organizations have the same private IP addresses.

Outside the private IP realm 104, the user application 108 and remote computing device 126 in the corporate office 106 see only the customer's internal private IP addresses. The ReNAT twin NAT client 110 and ReNAT twin NAT 118 are coordinated to translate between customer assigned private IP addresses and ReNAT-assigned UPIP so that the user applications 108 and remote computing device 126 see only the user workstation 102 internal private IP addresses. As such, the data sent from the user workstation 102 is received at the corporate office 106 at a gateway device 122 on a private network 124. The remote computing device 126 may then process the data accordingly.

Also depicted in FIG. 1 are the existing software functions 128 and the ReNAT functions manager 130. These components represent existing logic that may be utilized and/or accessed by the other components referenced in FIG. 1.

Figure 2:
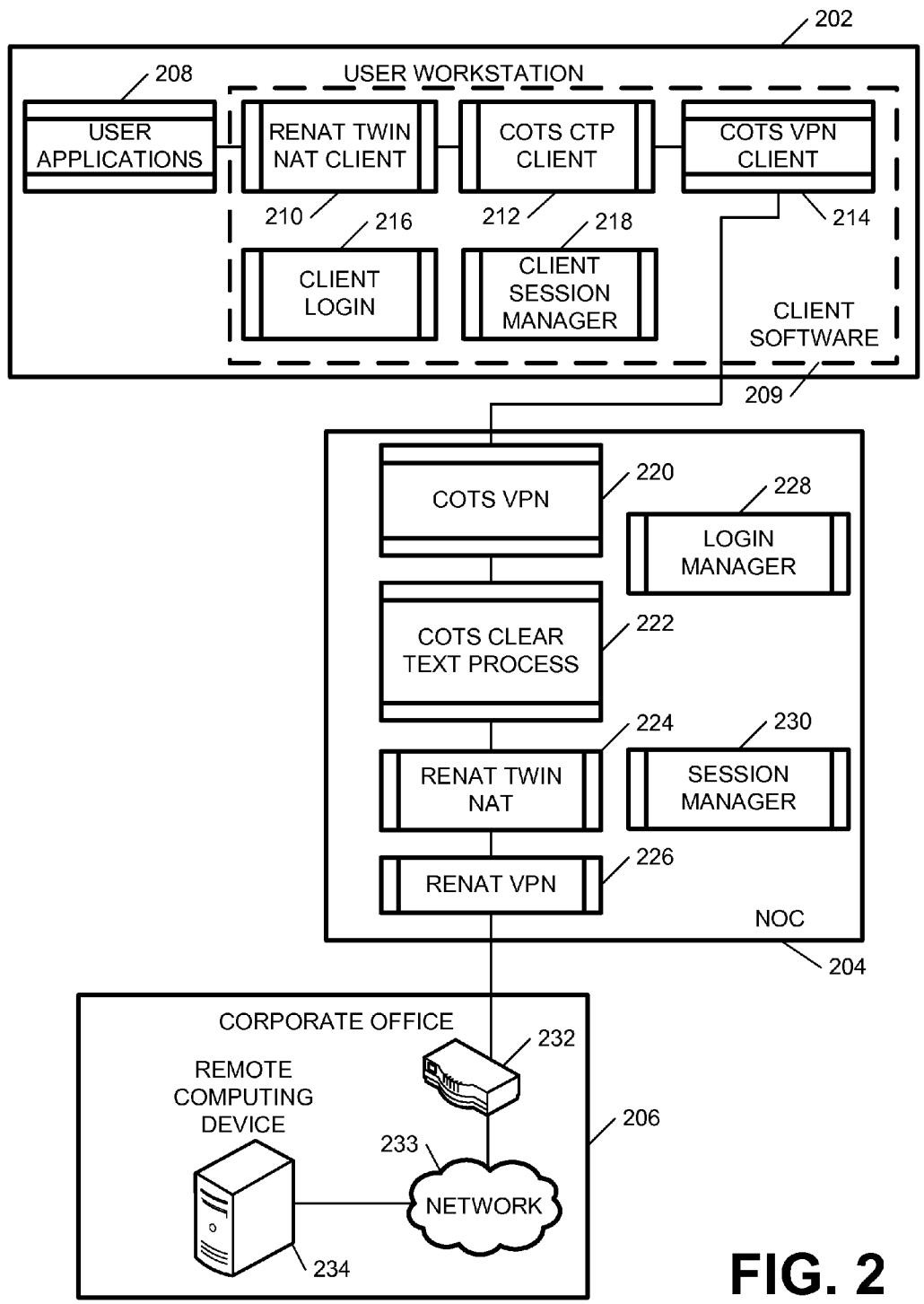
FIG. 2 depicts yet another computing environment, utilizing a twin NAT configuration, according to embodiments described herein.

FIG. 2 depicts yet another computing environment, utilizing a twin NAT configuration, according to embodiments described herein. As illustrated, the user workstation 202 may send data to an NOC 204 by translating private IP addresses into UPIP addresses. The data may then be translated back to private addresses before being sent to a corporate office 206. The user workstation 202 includes user applications 208, as well as client software 209. The client software 209 includes a ReNAT twin NAT client 210, a COTS clear text process (CTP) COTS CTP client 212, a COTS VPN client 214, a client login manager 216, and a client session manager 218. Specifically, the user applications 208 may instruct the user workstation 202 to send data to the remote computing device 234 on the corporate office 206. As such, the client login manager 216 may facilitate the communication of login credentials for the NOC 204. Upon logging the user into the NOC, the client session manager 218 may provide user interfaces and/or other data for identifying and/or accessing the desired computing device (in this case the remote computing device 234). Accordingly, the ReNAT twin NAT client 210 assigns data received from the user applications 208 UPIP. The ReNAT twin NAT client 210 may be configured to translate both source and destination IP addresses in the clear text packets to/from assigned UPIP. The COTS CTP client 212 receives and processes the data using clear text processing (or other protocol). The COTS VPN client 214 receives the data and creates a VPN tunnel for securely communicating the data to the NOC 204.

The NOC 204 receives the data at a COTS VPN 220 which removes the VPN encryption and provides the data for processing by the COTS clear text process manager 222. The COTS clear text process manager 222 processes the data according to clear text or other similar protocol. The data may then be processed by a ReNAT twin NAT 224. The ReNAT twin NAT 224 removes the UPIP and replaces the UPIP with a customer-defined private IP from the private network 233 and provides the public IP address of the customer gateway device 232. The ReNAT twin NAT 224 may be configured to translate both source and destination IP addresses in the clear text packets to/from assigned UPIP. For inbound packets, ReNAT twin NAT 224 uses the source IP provided by the ReNAT VPN 226 to identify the user. Outbound packets from the ReNAT twin NAT 224 to ReNAT VPN 226 include the destination public IP to identify the remote computing device 234. For outbound packets, the ReNAT Twin NAT 224 uses the source and destination UPIP address to identify the destination public IP address for the destination Gateway/VPN 232. Additionally, the VPN function is modified to provide the source IP on the external packets from the corporate office to identify the source gateway/VPN. Packets from ReNAT twin NAT 224 include the destination public IP to identify the destination Gateway/VPN.

Also included with the NOC 204 are a login manager 228 and a session manager 230, which manage login of the user workstation 202 and managing the session of the user workstation. On the link between ReNAT twin NAT 224 and ReNAT VPN 226, packets are wrapped in a private ReNAT-defined IP protocol that includes the public source and destination IP. Additionally, the ReNAT twin NAT 224 may assign a UPIP that overlaps with a customer assigned private IP address. However, this does not create routing issues since the assigned address is unique within the NOC and mapped to the public IP by session manager 230. As discussed above, the session manager 230 maintains session information for each user workstation 202 that is logged into the service. The session manager 230 provides UPIP coordination information to the ReNAT twin NAT 224 and updates client session manager 218 with assigned UPIP for this customer. The session manager 230 also maintains the relationship between UPIP and public IP of the customer's Gateway/VPN. The corporate office 206 includes a customer gateway device 232, a private network 233, and the remote computing device 234.

Figure 3:
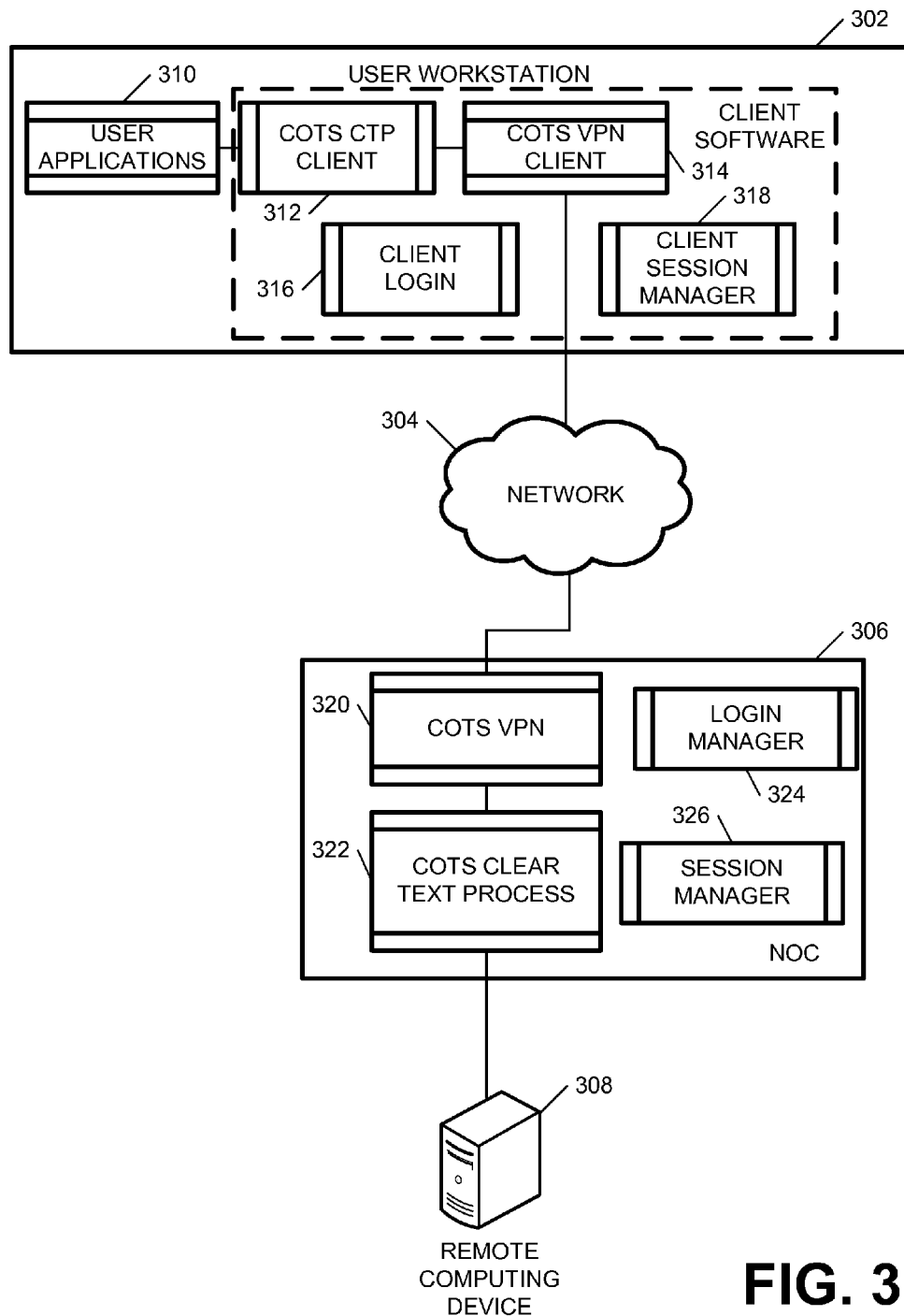
FIG. 3 depicts a computing environment to communicate with a remote computing device, according to embodiments described herein.

FIG. 3 depicts a computing environment to communicate with a remote computing device 308, according to embodiments described herein. As illustrated, a customer may not have a VPN to the customer's corporate office but may desire to utilize a VPN between the NOC and their workstation. Regardless, the user workstation 302 of FIG. 3 includes user applications 310, a COTS CTP client 312, a COTS VPN client 314, a client login manager 316, and a client session manager 318. As described above, the user applications 310 may communicate data to the COTS CTP client 312 for eventual communication via network 304 to the remote computing device 308. The network 304 may include any wide area and/or local area network, such as the Internet.

Accordingly, the client login manager 316 and the client session manager 318 may communicate with the login manager 324 and the session manager 326 to facilitate logging into and managing a session with the NOC 306. Once the session is established, the COTS CTP client 312 may process the data. Additionally, the COTS VPN client 314 may create a VPN tunnel between the user workstation 302 and the NOC 306 COTS VPN 320. The user workstation 302 may receive the data and send the data to the NOC 306. The NOC 306 can use the COTS VPN 320 to decrypt the data from the VPN and the COTS Clear Text Process 322 can further process the data for sending to the remote computing device 308.

Figure 4:
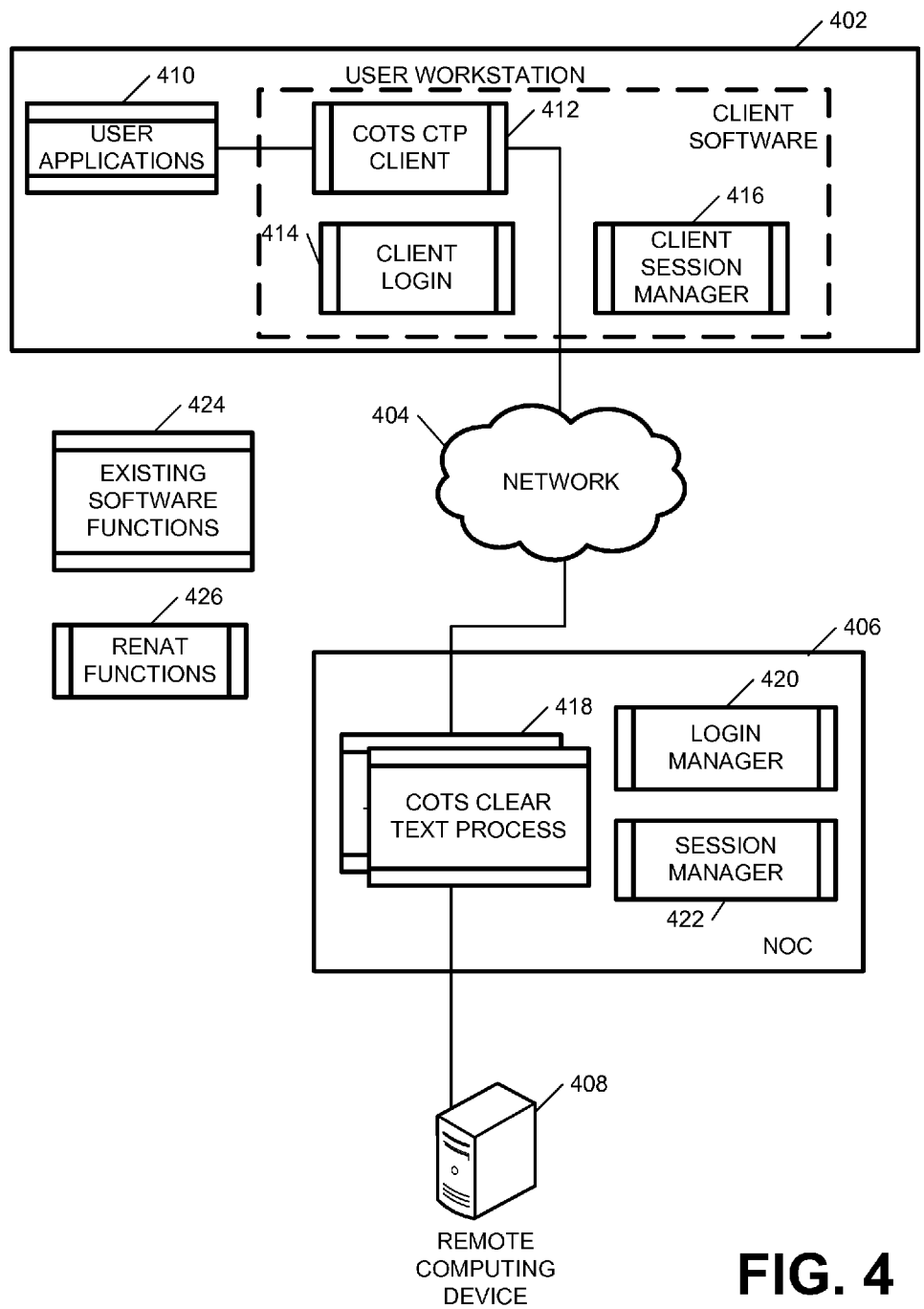
FIG. 4 depicts a computing environment for communicating with a remote computing device without utilizing a VPN, according to embodiments described herein.

FIG. 4 depicts a computing environment for communicating with a remote computing device 408 without utilizing a VPN, according to embodiments described herein. Specifically, FIG. 4 depicts multiple COTS process so that the customer can choose a desired level of service. For example, one COTS process may provide full acceleration of all traffic while a second COTS process only accelerates a portion of the traffic (such as all hypertext transfer protocol). Accordingly, the user workstation 402 of FIG. 4 may include user applications 410 for interacting with the remote computing device 408. Accordingly, the client login manager 414 and the client session manager 416 may communicate with the login manager 420 and the session manager 422 for establishing a connection between the user workstation 402 and the NOC 406. The user applications 410 may additionally generate data that the COTS CTP client 412 processes. The data is then sent using network 404, which communicates the data to the NOC 406. As described above, the network 404 may be any wide area or local area network. Depending on user settings, user selections, NOC settings, etc., the NOC 406 may implement one or more different COTS clear text processes 418 to process some or all of the data received. The NOC 406 may send the data to the remote computing device 408 for processing.

Figure 5:
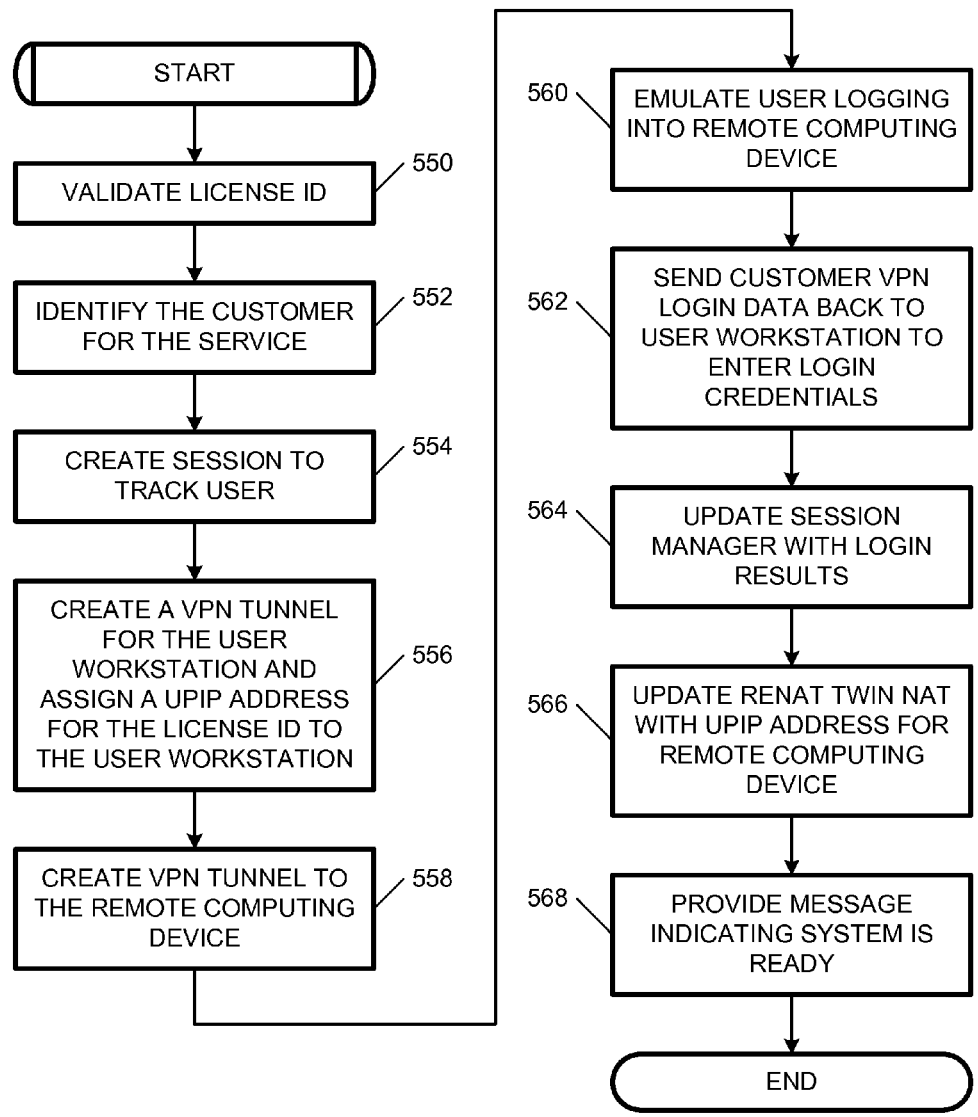
FIG. 5 depicts a flowchart that includes actions that a client workstation may perform for communicating with a remote computing device, according to embodiments described herein.

FIG. 5 depicts a flowchart that includes actions that a client workstation may perform for communicating with a remote computing device, according to embodiments described herein. As illustrated in block 550, a license ID may be validated, such as via the login manager. In block 552, the customer requesting the service may be identified. In block 554, a session may be created to track the user. In block 556, a VPN tunnel may be created for the user workstation and a UPIP address may be assigned to the license ID to the user workstation. In block 558, a VPN tunnel may be created to the remote computing device. In block 560, an emulation of the user logging into the remote computing device may be performed. In block 562, customer VPN login data may be sent back to the user workstation to enter login credentials. In block 564, the session manager may be updated with the login results. In block 566 the ReNAT twin NAT may be updated with the UPIP address for the remote computing device. In block 568, a message indicating that the system is ready may be provided.

Figure 6:
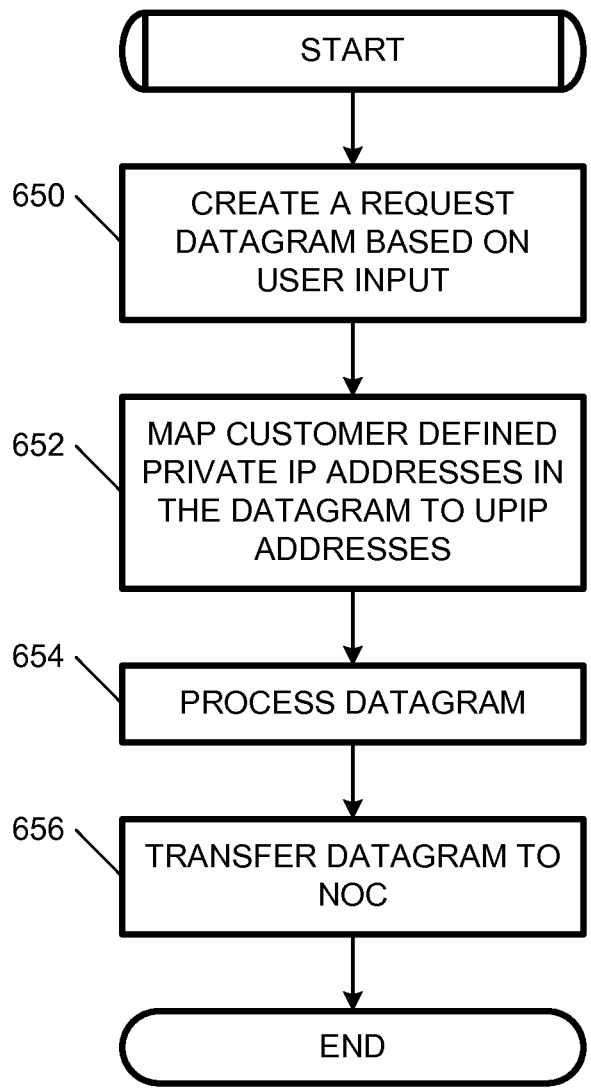
FIG. 6 depicts a flowchart that includes actions that a user workstation may perform in facilitating communication with a remote computing device once a session has been established, according to embodiments described herein.

As described with reference to FIG. 5, the user workstation may initialize the session for communicating with the remote computing device. FIG. 6 depicts a flowchart that includes actions that a user workstation may perform in facilitating communication with a remote computing device once a session has been established, according to embodiments described herein. As illustrated in block 650, the NOC may create a request datagram, based on user input. Specifically, this action may be created by the user workstation via the user application. Regardless, in block 652, the user workstation may map customer defined private IP addresses in the datagram to UPIP addresses. In block 654, the user workstation may process the datagram. In block 656, the datagram may be transferred to the NOC.

It should be understood that in FIGS. 3 and 4, a network 304, 404 is depicted between system components for illustrating utilization of the public Internet or other computing network. As will be understood, these are merely examples, as any of the components depicted in FIGS. 1-6 may be connected via a network infrastructure, depending on the embodiment.

Figure 7:
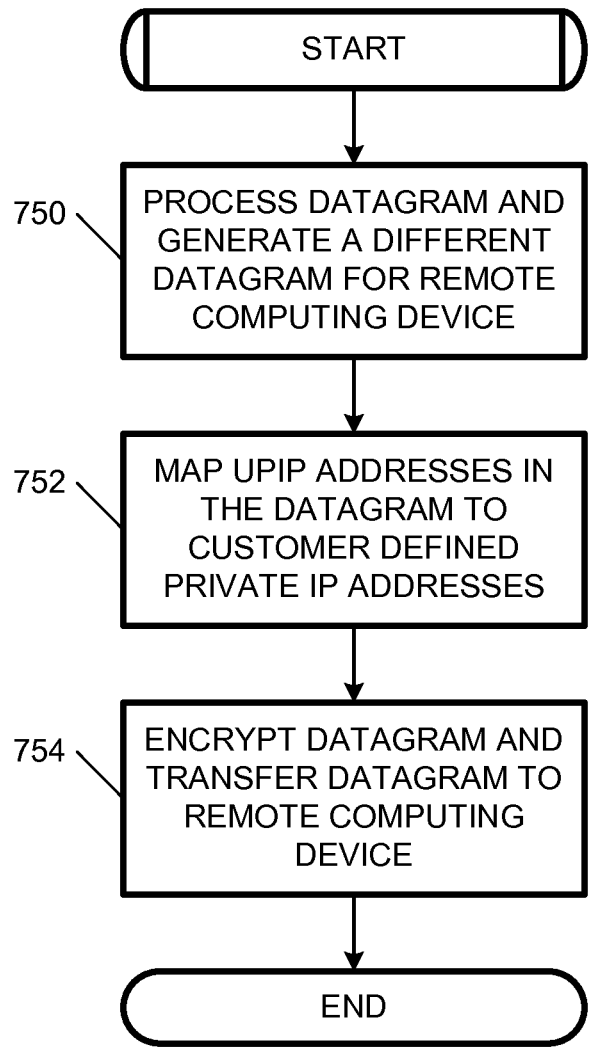
FIG. 7 depicts another flowchart that includes actions that a NOC may perform in facilitating communication between a user workstation and a remote computing device, according to embodiments described herein.

FIG. 7 depicts a flowchart that includes actions that a NOC may perform in facilitating communication between a user workstation and a remote computing device, according to embodiments described herein. As illustrated in block 750, the datagram may be processed by the NOC and a different datagram may be generated for sending to the remote computing device. In block 752, UPIP addresses may be mapped in the datagram to customer-defined private IP addresses. In block 754, the datagram may be encrypted and transferred to the remote computing device.

Figure 8:
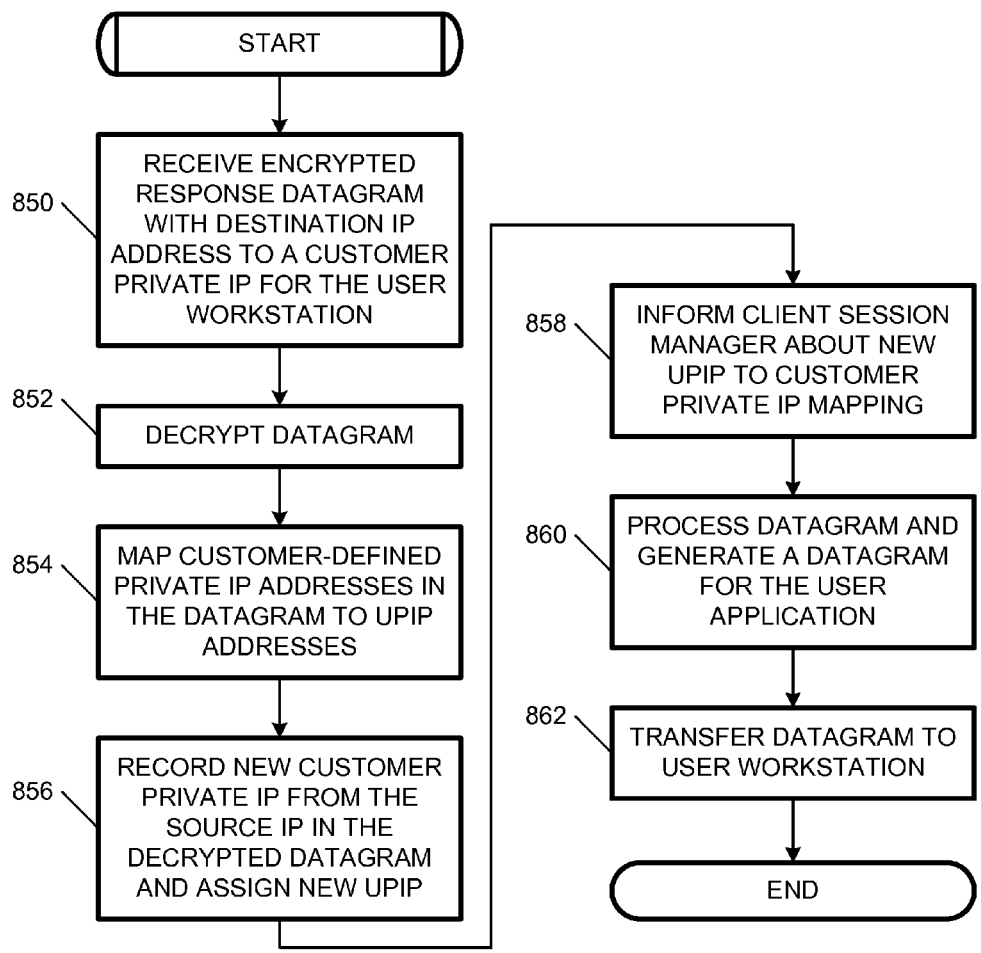
FIG. 8 depicts a yet another flowchart that includes actions that a NOC may perform in facilitating communication between a user workstation and a remote computing device, according to embodiments described herein.

FIG. 8 depicts another flowchart that includes actions that a NOC may perform in facilitating communication between a user workstation and a remote computing device, according to embodiments described herein. Specifically, while FIG. 7 depicts actions that may be performed when the user workstation sends data to the remote computing device, FIG. 8 depicts actions that may be performed when the remote computing device sends data to the user workstation. Accordingly, in block 850, an encrypted response datagram with a destination IP address to a customer private IP for the user workstation may be received. In block 852, the datagram may be decrypted. In block 854, the customer-defined private IP addresses may be mapped in the datagram to UPIP addresses. In block 856, a new customer private IP may be recorded from the source IP in the decrypted datagram and a new UPIP may be assigned. In block 858 the client session manager may be informed about the new UPIP to customer private IP mapping. In block 860, the datagram may be processed and a new datagram may be generated for the user application. In block 862, the new datagram may be sent to the user workstation.

It should be understood that, depending on the particular embodiment, one or more datagrams may be communicated to the remote computing device before generating the new datagram for the user workstation. As an example, if the computing environment is utilizing acceleration as the COTS process, the communication of multiple datagrams with the remote computing device may be performed.

Figure 9:
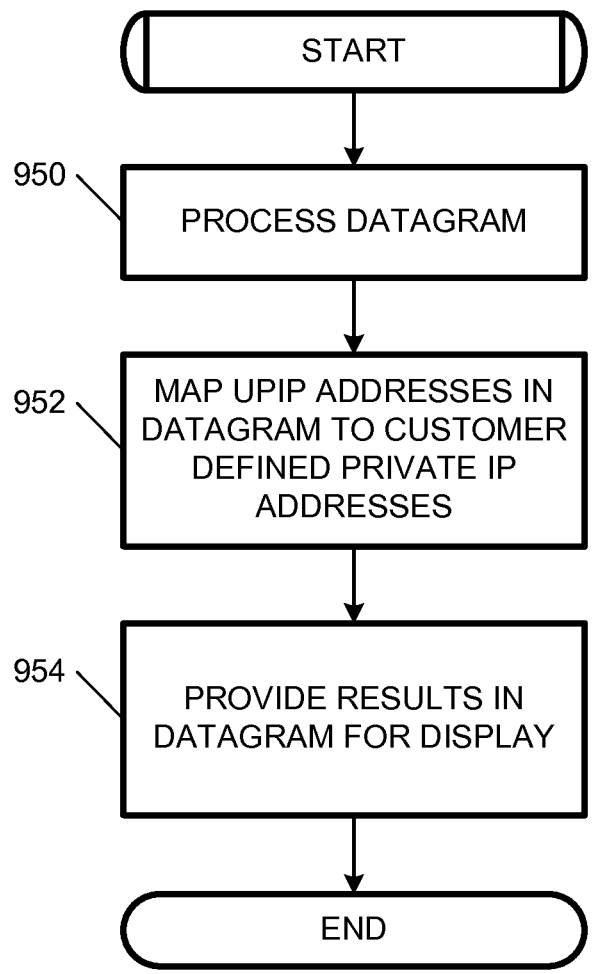
FIG. 9 depicts a flowchart that includes actions that a user workstation may perform in receiving data from a remote computing device via a NOC, according to embodiments described herein.

FIG. 9 depicts a flowchart that includes actions that a user workstation may perform in receiving data from a remote computing device via an NOC, according to embodiments described herein. As illustrated in block 950, the received datagram may be processed. In block 952, UPIP addresses may be mapped in the datagram to customer-defined private IP addresses. In block 954, the results in the datagram may be provided for display.

FIG. 10 depicts various hardware components that may be present in the NOC 204, according to embodiments described herein. In the illustrated embodiment, the NOC 204 includes one or more processor 1030, input/output hardware 1032, network interface hardware 1034, a data storage component 1036 (which stores login data 1038a and session data 1038b), and the memory component 1040. The memory component 1040 may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, the non-transitory computer-readable medium may reside within the NOC 204 and/or external to the NOC 204.

Additionally, the memory component 1040 may be configured to store operating logic 1042, the data communication logic 1044a, and the manager logic 1044b, each of which may be embodied as a computer program, firmware, and/or hardware, as an example. A local communications interface 1046 is also included in FIG. 10 and may be implemented as a bus or other interface to facilitate communication among the components of the NOC 204.

The processor 1030 may include any processing component operable to receive and execute instructions (such as from the data storage component 1036 and/or memory component 1040). The input/output hardware 1032 may include and/or be configured to interface with a monitor, keyboard, mouse, printer, camera, microphone, speaker, and/or other device for receiving, sending, and/or presenting data. The network interface hardware 1034 may include and/or be configured for communicating with any wired or wireless networking hardware, a satellite, an antenna, a modem, LAN port, wireless fidelity (Wi-Fi) card, WiMax card, mobile communications hardware, fiber, and/or other hardware for communicating with other networks and/or devices. From this connection, communication may be facilitated between the NOC 204 and other computing devices.

Similarly, it should be understood that the data storage component 1036 may reside local to and/or remote from the NOC 204 and may be configured to store one or more pieces of data for access by the NOC 204 and/or other components. In some embodiments, the data storage component 1036 may be located remotely from the NOC 204 and thus accessible via a network connection. In some embodiments however, the data storage component 1036 may merely be a peripheral device, but external to the NOC 204.

Included in the memory component 1040 are the operating logic 1042, the data communication logic 1044a, and the manager logic 1044b. The operating logic 1042 may include an operating system and/or other software for managing components of the NOC 204. Similarly, the data communication logic 1044a may include the COTS VPN 220, the COTS clear text process manager 222, the ReNAT twin NAT 224, the ReNAT VPN 226, and/or other pieces of logic for manipulating data and communicating the data between a user workstation 202 and the remote computing device 234. The manager logic 1044b may include the login manager 228, the session manager 230, and/or other components that cause the NOC 204 to establish sessions with the user workstation 202.

It should be understood that the components illustrated in FIG. 10 are merely exemplary and are not intended to limit the scope of this disclosure. While the components in FIG. 10 are illustrated as residing within the NOC 204, this is merely an example. In some embodiments, one or more of the components may reside external to the NOC 204. It should also be understood while the NOC 204 is depicted in FIG. 10, other computing devices described in FIG. 2 or other drawings may include similar hardware and software for providing the described functionality.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for providing dual network address translation, comprising:
   a network operations center (NOC) that includes a memory component, the memory component storing logic that, when executed by a processor, causes the system to perform at least the following:
   receive data from a user workstation across a wide area network, wherein the data is received via a first virtual private network (VPN) tunnel, wherein the data is encrypted with VPN encryption, and wherein the data is assigned a unique private internet protocol (UPIP) address that overlaps with a customer-defined private IP address and includes a security barrier;
   remove the VPN encryption from the data;

utilize a twin NAT network address translation (NAT) component to remove the UPIP address and replace the UPIP with the customer-defined private IP address from a private network at a destination;

wrap the data with the customer-defined private IP address in a private defined protocol that includes the public source address and the public destination address; and utilize a second VPN tunnel to communicate the data to the destination.

2. The system of claim 1, wherein the logic further causes the system to assign a family of IP addresses to a private realm wherein the family of IP addresses includes at least one of the following: IPv4 and IPv6.

3. The system of claim 1, wherein a plurality of IP addresses are assigned on the NOC, one for each of a plurality of private realms.

4. The system of claim 1, wherein the NOC associates a single IP address for all computing devices on a private realm, each having a unique in-network address.

5. The system of claim 4, wherein the NOC comprises at least one of the following: a traditional VPN component, a traditional clear text process component, a twin NAT, and a VPN.

6. The system of claim 1, further comprising a twin NAT, wherein the twin NAT stores NAT relationships that facilitate translation from the client workstation on a private network with the remote computing device on a remote network, while the client workstation and the wide area network are unaware of any IP address conversion.

7. The system of claim 6, further comprising the client workstation, wherein the client workstation comprises a dual twin NAT client for correlating between customer-assigned private IP addresses and the assigned unique private Internet Protocol (UPIP) address so that unique IP addresses are assigned for different private realms.

8. A method for dual network address translation, comprising:

receiving, via a processor at a network operations center (NOC), data from a user workstation across a wide area network, wherein the data is received via a first virtual private network (VPN) tunnel, wherein the data is encrypted using a VPN encryption, and wherein the data is assigned a unique private internet protocol (UPIP) address that overlaps with a customer-defined private IP address and includes a security barrier;

removing, via the processor at the NOC, the VPN encryption from the data;

utilizing, via the processor at the NOC, a twin network address translation (NAT) component to remove the UPIP address and replace the UPIP with the customer-defined private IP address from a private network at a destination;

wrapping, via the processor at the NOC, the data with the customer-defined private IP address in a private defined protocol that includes the public source address and the public destination address; and utilizing, via the processor at the NOC, a second VPN tunnel to communicate the data to the destination.

9. The method of claim 8, further comprising assigning a family of IP addresses to a private realm wherein the family of IP addresses includes at least one of the following: IPv4 and IPv6.

10. The method of claim 8, wherein a plurality of IP addresses are assigned on the NOC, one for each of a plurality of private realms.

11. The method of claim 8, further comprising associating a single IP address for all computing devices on a private realm, each having a unique in-network address.

12. The method of claim 8, further comprising storing NAT relationships that facilitate translation from a client workstation on a private network with a remote computing device on a remote network, while the client workstation and the wide area network are unaware of any IP address conversion.

13. The method of claim 8, further comprising correlating between customer-assigned private IP addresses and the assigned unique private Internet Protocol (UPIP) address so that unique IP addresses are assigned for a plurality of different private realms.

14. A non-transitory computer-readable medium for providing dual network address translation, comprising logic that, when executed by a processor, causes the processor to perform at least the following:

receive data from a user workstation across a wide area network, wherein the data is received via a first virtual private network (VPN) tunnel, wherein the data is encrypted using a VPN encryption, and wherein the data is assigned a unique private internet protocol (UPIP) address that overlaps with a customer-defined private IP address and includes a security barrier;

remove the VPN encryption from the data;

utilize a twin network address translation (NAT) component to remove the UPIP address and replace the UPIP with the customer-defined private IP address from a private network at a destination;

wrap the data with the customer-defined private IP address in a private defined protocol that includes the public source address and the public destination address;

utilize a second VPN tunnel to communicate the data to the destination; and map a unique private address in the data to customer defined private IP addresses.

15. The non-transitory computer-readable medium of claim 14, wherein the logic further causes the processor to assign a family of IP addresses to a private realm wherein the family of IP addresses includes at least one of the following: IPv4 and IPv6.

16. The non-transitory computer-readable medium of claim 14, wherein a plurality of IP addresses are assigned on a network operations center (NOC) side, one for each of a plurality of private realms.

17. The non-transitory computer-readable medium of claim 14, wherein the logic causes the processor to associate a single IP address for all computing devices on a private realm, each having a unique in-network address.

18. The non-transitory computer-readable medium of claim 14, wherein the logic includes at least one of the following: logic for implementing a traditional VPN component, logic for implementing a traditional clear text process component, logic for implementing a twin NAT, and logic for implementing a VPN.

19. The non-transitory computer-readable medium of claim 14, wherein the logic causes the processor to store NAT relationships that facilitate translation from a client workstation on a private network with a remote computing device on a remote network, while the client workstation and the wide area network are unaware of any IP address conversion.

20. The non-transitory computer-readable medium of claim 14, wherein the logic includes a dual twin NAT client for correlating between customer-assigned private IP addresses and the assigned unique private Internet Protocol (UPIP) address so that unique IP addresses are assigned for a plurality of different private realms.

* * * * *